US010203453B2

(12) United States Patent
Chen

(10) Patent No.: US 10,203,453 B2
(45) Date of Patent: Feb. 12, 2019

(54) FACET OPTICAL COUPLER

(71) Applicant: Acacia Communications, Inc., Maynard, MA (US)

(72) Inventor: Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 15/620,601

(22) Filed: Jun. 12, 2017

(65) Prior Publication Data

US 2017/0285265 A1     Oct. 5, 2017

Related U.S. Application Data

(63) Continuation of application No. 14/796,678, filed on Jul. 10, 2015, now Pat. No. 9,703,038.

(60) Provisional application No. 62/023,529, filed on Jul. 11, 2014.

(51) Int. Cl.
| | | |
|---|---|---|
| *G02B 6/12* | (2006.01) | |
| *G02B 6/14* | (2006.01) | |
| *G02B 6/122* | (2006.01) | |
| *G02B 6/24* | (2006.01) | |

(52) U.S. Cl.
CPC ........... *G02B 6/1228* (2013.01); *G02B 6/14* (2013.01); *G02B 6/24* (2013.01); *G02B 2006/12097* (2013.01)

(58) Field of Classification Search
CPC .................... G02B 6/30; G02B 6/305
See application file for complete search history.

(56) References Cited

U.S. PATENT DOCUMENTS

| 4,781,424 | A | 11/1988 | Kawachi et al. |
| 6,987,898 | B2* | 1/2006 | Tran ................. G01N 33/54373 |
| | | | 356/73.1 |
| 8,326,100 | B2 | 12/2012 | Chen |
| 9,703,038 | B1 | 7/2017 | Chen |
| 2002/0041739 | A1 | 4/2002 | Wu |
| 2012/0241600 | A1* | 9/2012 | Lee ..................... G02B 6/4214 |
| | | | 250/227.11 |
| 2017/0343734 | A1* | 11/2017 | Collins ................. G02B 6/305 |

FOREIGN PATENT DOCUMENTS

EP        3 091 380 A1     11/2016

OTHER PUBLICATIONS

Chen et al., Low-Loss and Broadband Cantilever Couplers Between Standard Cleaved Fibers and High-Index-Contrast Si₃N₄ or Si Waveguides. IEEE Photon Tech Lett. Dec. 1, 2010;22(23):1744-6.

* cited by examiner

*Primary Examiner* — Omar R Rojas
(74) *Attorney, Agent, or Firm* — Wolf, Greenfield & Sacks, P.C.

(57) ABSTRACT

Techniques for forming a facet optical coupler to couple light at an edge of silicon substrate are described. The facet optical coupler includes a silicon substrate, a layer of second material disposed on the silicon substrate and in direct contact with the edge of the silicon substrate, and an undercut region disposed between a portion of the silicon substrate and the layer of second material. The undercut region is offset from the edge to provide mechanical integrity of the facet optical coupler to improve production of photonic integrated circuits having the facet optical coupler from a wafer.

20 Claims, 6 Drawing Sheets

*Prior Art*

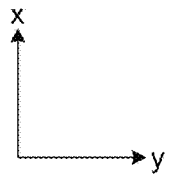
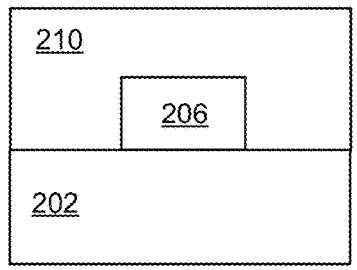
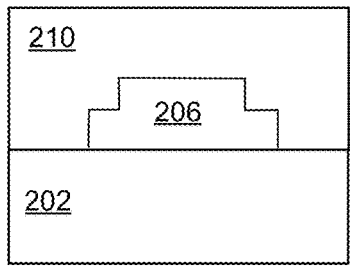
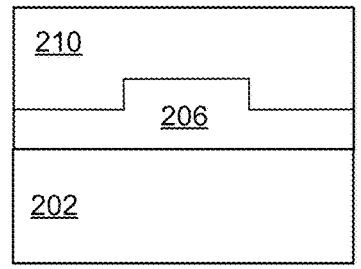
FIG. 3A     FIG. 3B     FIG. 3C
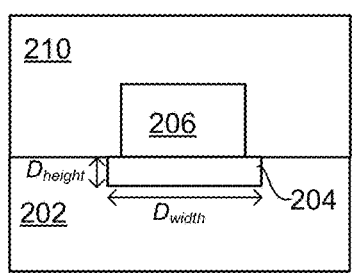
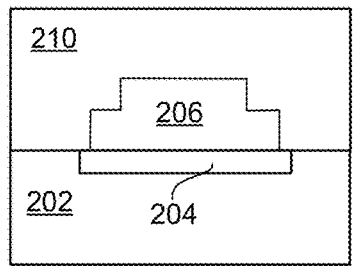
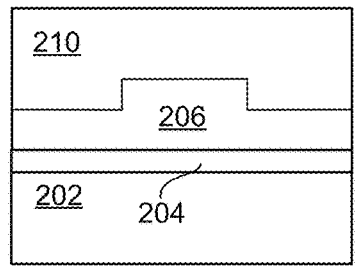
FIG. 4A     FIG. 4B     FIG. 4C

FACET OPTICAL COUPLER

RELATED APPLICATIONS

The present application is a continuation and claims the benefit under 35 U.S.C. § 120 of U.S. application Ser. No. 14/796,678, filed on Jul. 10, 2015 entitled "FACET OPTICAL COUPLER," which is hereby incorporated herein by reference in its entirety. Application Ser. No. 14/796,678 claims the benefit under 35 U.S.C. § 119(e) of U.S. Provisional Patent Application Ser. No. 62/023,529 entitled "FACET OPTICAL COUPLER," filed Jul. 11, 2014, which is incorporated herein by reference in its entirety.

BACKGROUND

Field

The present application relates to a facet optical coupler and related apparatus and methods.

Related Art

A photonic integrated circuit (PIC) includes integrated optical components on a substrate. A facet optical coupler couples an external optical component, such as an optical fiber, to a waveguide of the PIC via an edge of the substrate.

BRIEF SUMMARY

According to an aspect of the present application a facet optical coupler is provided. The facet optical coupler comprises a silicon substrate having an edge, a waveguide, a layer of second material, and an undercut region. The layer of second material is disposed on the silicon substrate and in contact with the silicon substrate at the edge. The waveguide is embedded within the layer of second material. The undercut region is disposed between a portion of the silicon substrate and the layer of second material.

According to another aspect of the present application a method of manufacturing a facet optical coupler is provided. The method comprises forming, in a surface of a silicon substrate having a first index of refraction, a region having a second index of refraction less than the first index of refraction. The silicon substrate further comprises an edge. The method further comprises forming a layer of second material on the surface of the silicon substrate such that an edge of the layer of second material is substantially co-planar with the edge of the silicon substrate and forming a waveguide embedded in the layer of second material.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIGS. 3A-3C illustrate, in cross-sectional views, alternative examples of the facet coupler of FIG. 2 taken along line A-A' in FIG. 2.

FIGS. 4A-4C illustrate, in cross-sectional views, alternate examples of the facet coupler of FIG. 2 taken along line B-B' in FIG. 2.

DETAILED DESCRIPTION

Figure 1A:
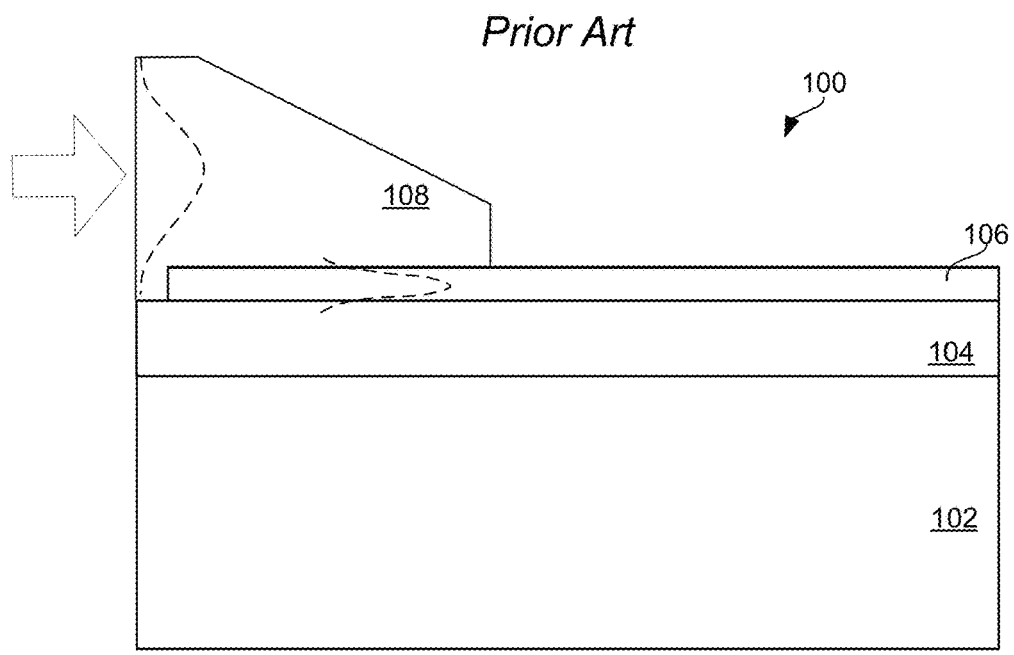
FIGS. 1A and 1B are cross-sectional diagrams of examples of facet couplers.

Aspects of the present application relate to a facet optical coupler of a silicon-based integrated device. The contrast in the indices of refraction between silicon and other materials (e.g., silicon dioxide, air) allows the formation of silicon-based photonic integrated circuits (PICs) with submicron waveguide dimensions. While PICs can include multiple components because of these submicron dimensions, coupling an optical fiber as an optical input or output to a submicron waveguide on the PIC can be challenging due to the mismatch in mode field size between the optical fiber and the waveguide. For example, a standard single-mode optical fiber has a mode field diameter of approximately 10 microns, while a silicon submicron waveguide has a mode field diameter of less than 1 micron. Direct coupling or butt coupling between the fiber and the waveguide may result in significant coupling loss, such as more than 20 dB in some instances. Thus, coupling techniques that account for the significantly different mode sizes between an optical fiber and a submicron silicon waveguide may improve performance of silicon based PICs by reducing coupling loss.

One type of coupling technique may include a grating coupler on an integrated device, where mode matching can be achieved by forming the dimensions of the waveguide and positioning additional elements to direct scattered light. Such couplers may have a narrow optical bandwidth because the capability to direct light between the fiber and the waveguide depends on the extent to which phase matching conditions are met. Another type of coupling technique may vary the dimensions and/or shape of the waveguide to improve mode matching by expanding the mode field of the waveguide in one or more dimensions to sufficiently couple with the mode field of the optical fiber. The waveguide may be tapered in one or more dimensions perpendicular to the direction of light propagation within the waveguide. However, challenges may arise in implementing these designs because of the index of refraction of the surrounding materials, including cladding materials and the silicon substrate. The large contrast in the indices of refraction between the silicon and cladding materials provides that the tapered waveguide has a narrow tip, such as 50 nm or less, to sufficiently expand the mode field. The silicon substrate may be located within 3 microns or less of the waveguide and may interfere with the mode field expansion of the waveguide due to this proximity.

Applicants have appreciated that incorporating a layer of second material in a facet optical coupler of a photonic integrated circuit (PIC) may improve the coupling of light between an optical fiber and the PIC. The layer of second material may function as an auxiliary waveguide bridging the external coupling beam and the submicron silicon waveguide. Accordingly, aspects of the present application relate to a facet optical coupler with a layer of second material disposed on a silicon substrate and in direct contact with the silicon substrate. A waveguide of the integrated device may be embedded within the layer of second material. In some embodiments, the layer of second material and the silicon substrate may have coplanar edges.

A cross-sectional view of a facet optical coupler is shown in FIG. 1A. Facet optical coupler 100 includes silicon substrate 102, layer 104, silicon waveguide 106, and overlay region 108. The overlay region may act as a waveguide and may have a refractive index higher than that of layer 104. Overlay region 108 may define the size and shape of the mode field. Overlay region 108 may include a taper, and the buried waveguide 106 may include a taper as well, both of which are to direct light coupled into overlay region 108 towards waveguide 106, as shown by the dashed lines in FIG. 1A. The dimensions of overlay region 108 at the edge of the facet optical coupler (at the arrow shown in FIG. 1A) may constrain expansion of the mode and may lack suitable coupling for some optical fibers, such as optical fibers with a large mode field size (e.g., approximately 10 microns).

Figure 1B:
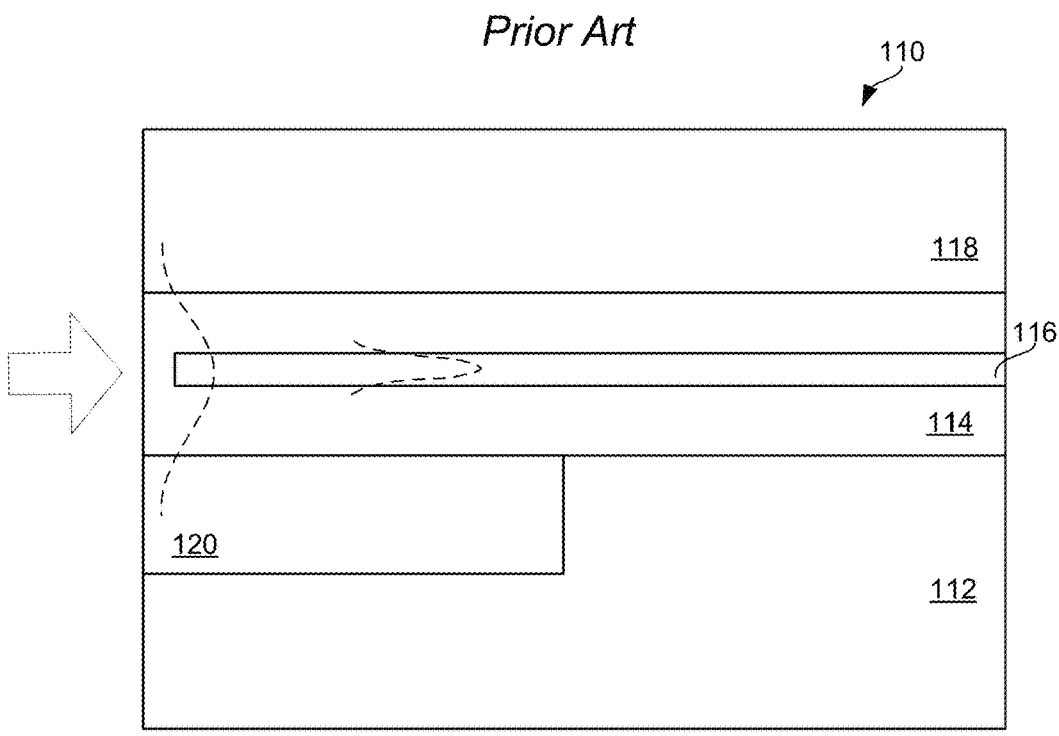

A cross-sectional view of another facet optical coupler is shown in FIG. 1B. Facet optical coupler 110 includes silicon substrate 112, undercut region 120, layer 114, waveguide 116, and cladding 118. Undercut region 120 separates silicon substrate 112 from waveguide 116 near the facet, reducing interference in the mode field expansion during coupling of facet optical coupler 110 with an optical fiber. As shown by the dashed lines in FIG. 1B, the mode field expands near the edge of the integrated device and contracts in a direction of light propagation along waveguide 116. Undercut region 120 may have a lower refractive index than that of both the layer 114 and silicon substrate 112.

In some cases, undercut region 120 may be air, which results in layer of second material 114 being suspended over silicon substrate 112 at the edge. Having undercut region 120 located at an edge where layer 114 is suspended reduces the mechanical integrity of facet optical coupler 110. This lack of structural integrity may be particularly problematic during formation of an integrated device having facet coupler 100 because the structure of the facet coupler may break or become faulty when a wafer is diced along edges of the integrated device and/or when adhering optical fibers to the edges of the device for packaging of the device.

Applicants have appreciated that offsetting the undercut region from an edge of a silicon substrate can result in suitable coupling performance even if there is a region where the silicon substrate forms an interface with a layer of second material. Accordingly, aspects of the present application relate to forming a facet optical coupler with an undercut region offset a distance from an edge of an integrated device. Such an undercut region may improve the mechanical integrity of the device by adhering a silicon substrate and a layer of second material at an edge of the integrated device. The distance by which the undercut region is offset from the edge may be selected to provide suitable coupling efficiency for the facet coupler while maintaining sufficient mechanical integrity. In this manner, a facet optical coupler having an offset undercut region may facilitate production and processing of integrated devices having the facet optical coupler while providing desired coupling efficiency with an external optical component.

In some embodiments, the undercut region may be formed by removing a portion of the silicon substrate, and in some embodiments, filling the removed portion with a filler material having a lower index of refraction than the silicon substrate and the second material.

The aspects and embodiments described above, as well as additional aspects and embodiments, are described further below. These aspects and/or embodiments may be used individually, all together, or in any combination of two or more, as the application is not limited in this respect.

Figure 2:
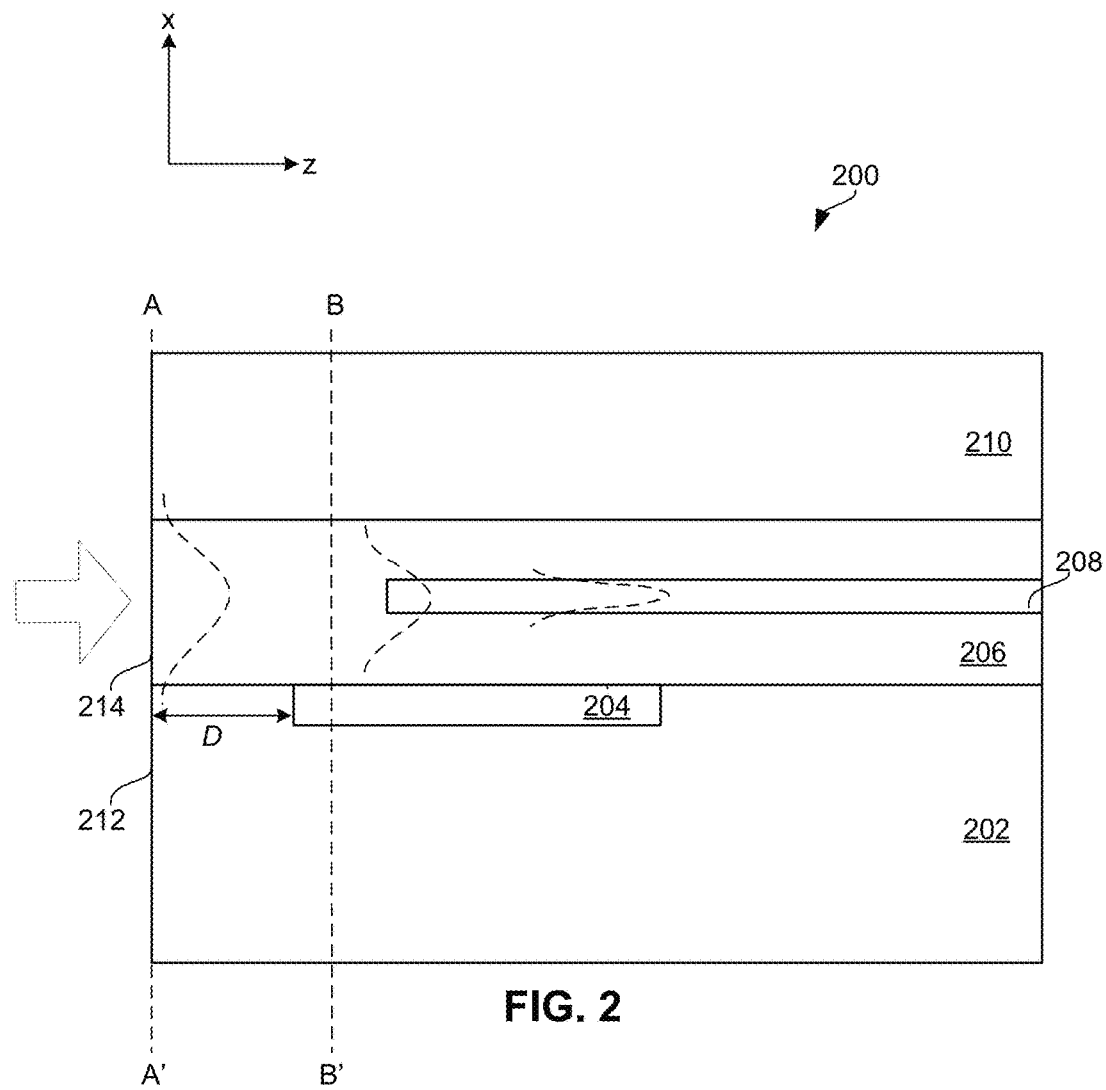
FIG. 2 is a cross-sectional diagram of a facet coupler having an offset undercut region, according to a non-limiting embodiment.

An exemplary facet optical coupler having an offset undercut region is shown in FIG. 2. The facet optical coupler is configured to couple light between an optical fiber positioned proximate to edge 214 and waveguide 208. As an example, the arrow and dashed curved lines shown in FIG. 2 indicate the propagation of light through the facet optical coupler 200 from an optical fiber near edge 214 into waveguide 208 along the z-direction, where the spread of the curved dashed lines indicates a variation in mode field size. Facet optical coupler 200 may be used as an optical input or an optical output by changing the direction of light propagation. Waveguide 208 may include silicon and may be considered a silicon waveguide. Although FIG. 2 shows the propagation of input light, facet coupler 200 may be configured as an optical output where light propagating through waveguide 208 couples to an optical fiber or other external optical component positioned proximate to edge 214.

Facet optical coupler 200 includes silicon substrate 202 having an edge 212. A layer of second material 206 is disposed on silicon substrate 202. Waveguide 208 may be embedded within layer of second material 206. Layer of second material 206 may be in direct contact with silicon substrate 202 at edge 212. The surface of silicon substrate 202 and layer of second material 206 may form an interface, where an edge of the interface is located at edge 212 of silicon substrate 202. The interface between silicon substrate 202 and layer of second material 206 may be substantially perpendicular to edge 212 of silicon substrate 202. In some embodiments, edge 214 of layer of second material 206 may be coplanar with edge 212. Layer of second material 206 may have a lower index of refraction than substrate 202 and may have higher index of refraction than cladding layer 210. Layer of second material 206 may include a dielectric material, and may be considered a dielectric layer. Layer of second material 206 may include one or more of $SiO_2$, SiON, and $Si_3N_4$, by way of example and not limitation.

Facet optical coupler 200 also includes undercut region 204 disposed between a portion of silicon substrate 202 and layer of second material 206. In some embodiments, D may be at least 10 microns, at least 20 microns, at least 50 microns, at least 100 microns, or at least 500 microns. Undercut region 204 may have an index of refraction lower than that of layer of second material 206. In embodiments where layer of second material 206 includes silicon dioxide, undercut region 204 may have an index of refraction less than silicon dioxide. Undercut region 206 may include a gas (e.g., air), a liquid (e.g., index-matching oil), and/or a solid filler material (e.g., thermal- or UV-curable adhesive or epoxy). Undercut region 204 may be offset from edge 212 in a direction perpendicular to edge 212 of silicon substrate 202. The offset direction of undercut region 204 from edge 212 may be in a direction of light propagation through facet optical coupler 200 such that there is a region where silicon substrate 202 and layer of second material 206 are in contact between edges 212 and 214 and undercut region 204. Edges 212 and 214 may form an edge of an integrated device having facet coupler 200, and undercut region 204 may be offset by a certain distance from the edge of the device. By having undercut region 204 offset from edge 212, layer of second material 206 contacts silicon substrate 202 at edge 212 and provides mechanical integrity to the edge of the integrated device, rather than having a suspended structure at the edge, such as the facet coupler structure shown in FIG. 1B. A facet optical coupler, such as 200, where an undercut region is offset from an edge of an integrated device reduces mechanical fragility at the edge, allowing for improved production and processing of the integrated device when dicing a wafer and/or attachment of one or more optical fibers to the integrated device at the edge.

Facet optical coupler 200 may include cladding layer 210 positioned on layer of second material 206. Cladding layer 210 may provide an index of refraction contrast at an interface between cladding layer 210 and layer of second material 206. Cladding layer 210 may have a lower index of refraction than layer of second material 206. Cladding layer 210 may include air or, in embodiments where layer of second material 206 is silicon dioxide, may include a material with an index of refraction lower than silicon dioxide. In some embodiments, both cladding layer 210 and undercut region 204 may include the same material.

Layer of second material 206 may have any suitable dimensions configured to couple light between waveguide 208 and edge 214 such that light couples to an external optical component positioned proximate to edge 214. Exemplary cross-sectional configurations of facet coupler 200 along line A to A', which is at edge 212 of silicon substrate 202 and at edge 214 of layer of second material 206, are shown in FIGS. 3A, 3B, and 3C. Layer of second material 206 contacts silicon substrate 202, forming an interface between layer 206 and substrate 202 along the y-direction. A cross-sectional width of layer of second material 206 may vary in the y-direction to include a portion having a larger width in contact with silicon substrate 202, such as shown in FIGS. 3B and 3C. In some instances, layer of second material 206 may have a width that covers a surface of substrate 202 such that cladding layer 210 lacks direct contact with substrate 202 as shown in FIG. 3C. A direction for the variation in cross-sectional width of layer of second material 206 may be considered perpendicular to a direction of light propagation and parallel to a surface of substrate 202.

Undercut region 204 may have any suitable configuration. In some embodiments, undercut region 204 may extend beyond a dimension of layer of second material 206. Exemplary cross-sectional configurations of facet optical coupler 200 along line B to B' are shown in FIGS. 4A, 4B, and 4C, corresponding to FIGS. 3A, 3B, and 3C, respectively. As shown in FIG. 4A, undercut region 204 may have a cross-sectional width, $D_{width}$, and height, $D_{height}$. Undercut region 204 may have a larger cross-sectional width than layer of second material 206 such that undercut region 204 extends beyond layer of second material 206 along the y-direction, as shown in FIGS. 4A and 4B. In some embodiments, undercut region 204 may have a similar or the same cross-sectional width as layer of second material 206, as shown in FIG. 4C. The cross-sectional width of undercut region 204 may be a dimension of the undercut region 204 that lies in a direction parallel to an interface between undercut region 204 and layer of second material 206, and perpendicular to a direction of light propagation. In some embodiments, the cross-sectional width of undercut region 204 may be at least 10 microns or at least 14 microns. Undercut region 204 provides a separation between substrate 202 and layer of second material 206 by having a cross-sectional height, such as $D_{height}$ along the x-direction shown in FIG. 4A. The dimension of undercut region 204 corresponding to a cross-sectional height may lie in a direction that is perpendicular to an interface of undercut region 204 and layer of second material 206 and perpendicular to a direction of light propagation. In some embodiments, the cross-sectional height of undercut region 204 may be at least 2 microns or at least 10 microns.

Some embodiments of the present application relate to layer of second material 206 having a lower refractive index than silicon substrate 202, where layer of second material 206 may act as a waveguide with some amount of optical power leakage into substrate 202. The leakage occurs primarily over a region that light propagates where there is an interface between substrate 202 and layer of second material 206, such as dimension D shown in FIG. 2. Within this region, as an optical beam hits the interface between substrate 202 and layer 206 there is a certain amount of optical loss that occurs from refraction at the interface. In some embodiments, the design of layer of second material 206 as a waveguide may reduce optical power leakage, such as by configuring layer 206 to reduce the amount of power loss per a hit of the optical beam at the interface. In some embodiments, reducing a dimension of this region along a direction of light propagation, such as the length of D, may reduce the refraction loss and may improve coupling efficiency of the facet optical coupler.

Figure 5:
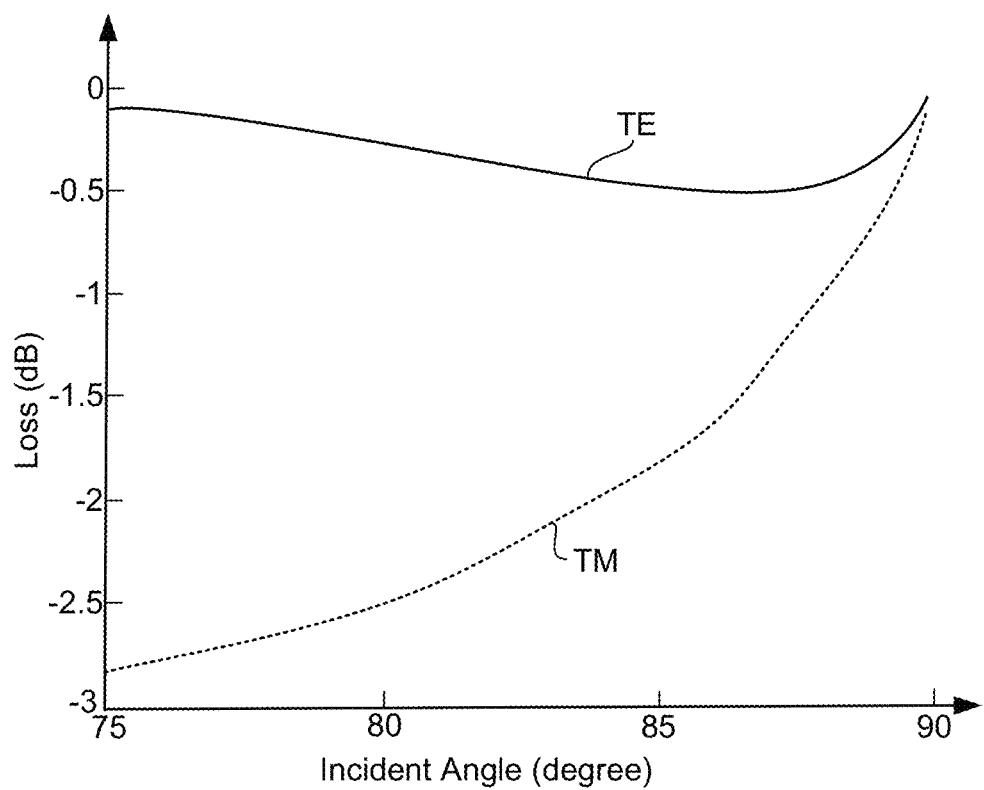
FIG. 5 is a plot of power loss as a function of incident angle for polarizations TE and TM in a facet coupler of the type illustrated in FIG. 2.

In some embodiments, the power leakage at the interface between layer of second material 206 and substrate 202 may be reduced by suitable selection of the dimensions of the layer of second material 206 and/or the refractive indices of layer of second material 206 and cladding layer 210. The optical modes supported by layer of second material 206 may have some amount of leakage when the refractive index of substrate 202 is higher than that of layer of second material 206. The leakage can be understood by way of a ray optics depiction of the propagation of light through layer of second material 206. For each mode, light travels at an angle from the propagation direction z, and is bounced back and forth at the interfaces of layer of second material 206. The amount of power leakage per unit length depends on the incidence angle at the interface between layer of second material 206 and substrate 202. As the angle approaches 90 degrees from the normal of the interface, the light beam may nearly graze along the interface, and the power leakage decreases. FIG. 5 is a plot illustrating the amount of leakage loss (on the y-axis) as a function of incident angle for both transverse-electric (TE) and transverse-magnetic (TM) polarizations with the example of an interface between silicon dioxide and silicon. At large incident angles approaching 90 degrees, the amount of leakage loss becomes small for both TE and TM polarizations to provide sufficient coupling efficiency for facet coupler 200. One can obtain a large incident angle towards 90 degrees by making the effective index of the mode very close to the refractive index of layer of second material 206. This in turn can be achieved by making the cross-sectional dimensions of layer of second material 206 relatively large and the index of the cladding 210 relatively close to that of the layer of second material 206, while preserving a mode size comparable to that of the external coupling mode.

Figure 6:
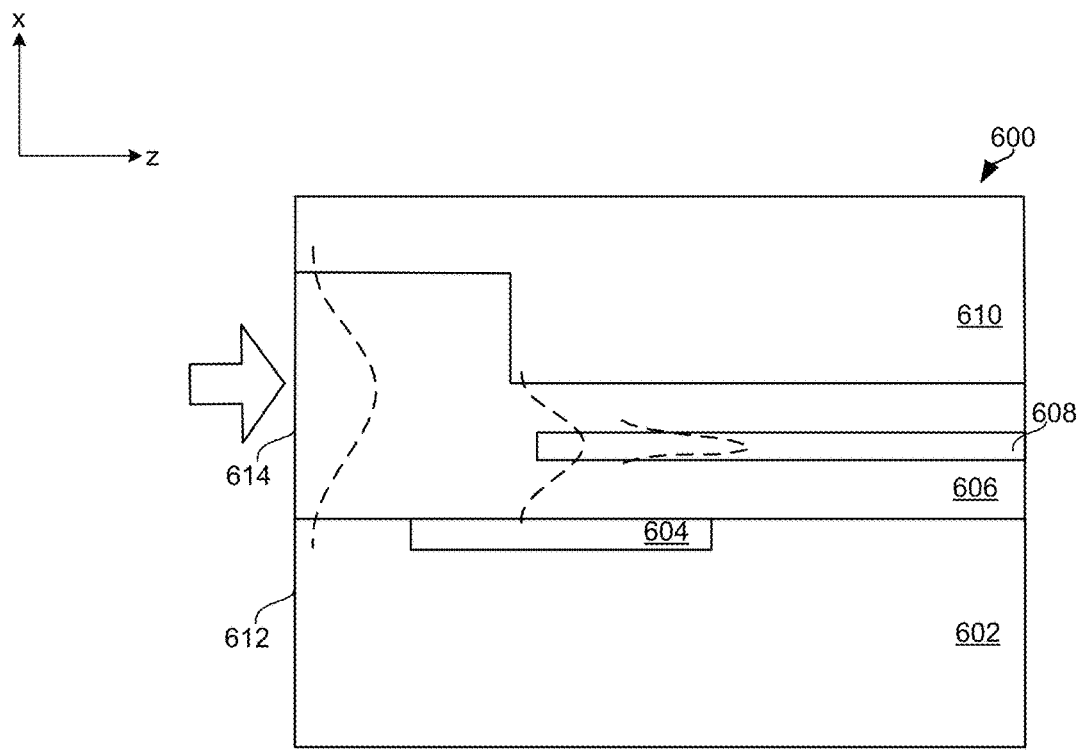
FIG. 6 is a cross-sectional diagram of an example of a facet coupler according to a non-limiting embodiment.

Dimensions of the layer of second material, the undercut region, and/or waveguide may provide varying mode field size capabilities to allow sufficient coupling of an optical fiber, or other external optical component, with a desired mode field size to facet optical coupler. Some embodiments relate to configuring a layer of second material to reduce power lost through leakage, such as by tapering one or more dimensions of the layer to alter the field mode within the layer of second material. The layer of second material may have a decrease in size taken in a direction moving from an edge of a silicon substrate to a waveguide by having a reduced dimension in the x-direction and/or y-direction. Some embodiments may include variation along the x-direction, such as a vertical tapering and/or step profile of the height of the layer of second material. An exemplary facet optical coupler is shown in FIG. 6 where layer of second material 606 decreases in size from edge 612 of silicon substrate 602 to waveguide 608. As shown in FIG. 5, layer of second material 606 may include a step profile, where a height of layer 606 along the x-direction decreases by a certain amount at a location overlapping with undercut region 604 and non-overlapping with waveguide 608. Cladding layer 610 positioned on layer of second material 606 may have one or more dimensions conforming to the variation of layer 606. Having a larger cross-sectional area of layer of second material 606 at edge 614 may facilitate mode overlap between an optical fiber positioned at edge 614 and facet coupler 600. By reducing the cross-sectional area of layer 606, the mode field within layer 606 is sufficiently reduced to allow coupling of light to waveguide 608. Such a configuration may improve coupling efficiency between layer of second material 606 and waveguide 608 and/or improve the fabrication process by relaxing fabrication requirements for the waveguide 608, such as requirements related to including an inverse taper for waveguide 608.

Figure 7:
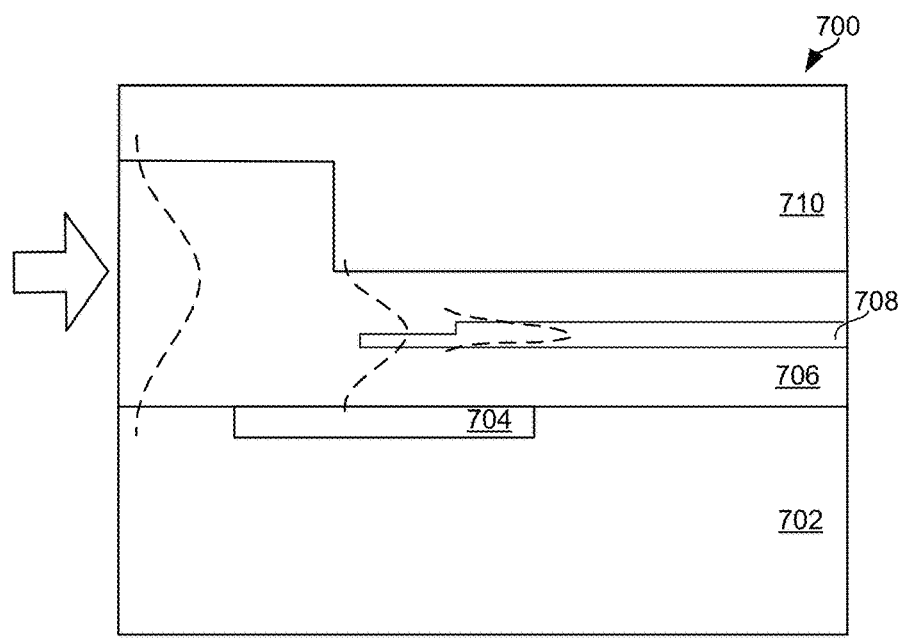
FIG. 7 is a cross-sectional diagram of an example of a facet coupler according to a non-limiting embodiment.

Some embodiments relate to configuring a waveguide to have variation in one or more dimensions perpendicular to a direction of light propagation. A cross-sectional area of a waveguide may increase in a direction moving away from an edge the waveguide towards a center portion of the waveguide. The waveguide may have a first portion that overlaps with an undercut region and a second portion that does not overlap with the undercut region. The waveguide may increase in size moving in a direction from the first portion to the second portion. An exemplary facet optical coupler is shown in FIG. 7 where waveguide 708 has a variable dimension along the x-direction. As shown in FIG. 7, waveguide 708 may include a vertical step profile such that waveguide 708 has a smaller dimension in a region where waveguide 708 and layer of second material 706 couple. Facet optical coupler 700 also includes substrate 702, layer of second material 706, and cladding layer 710. Such a configuration may improve coupling efficiency between layer of second material 706 and waveguide 708 and/or improve the fabrication process by relaxing fabrication requirements for waveguide 708.

Figure 8:
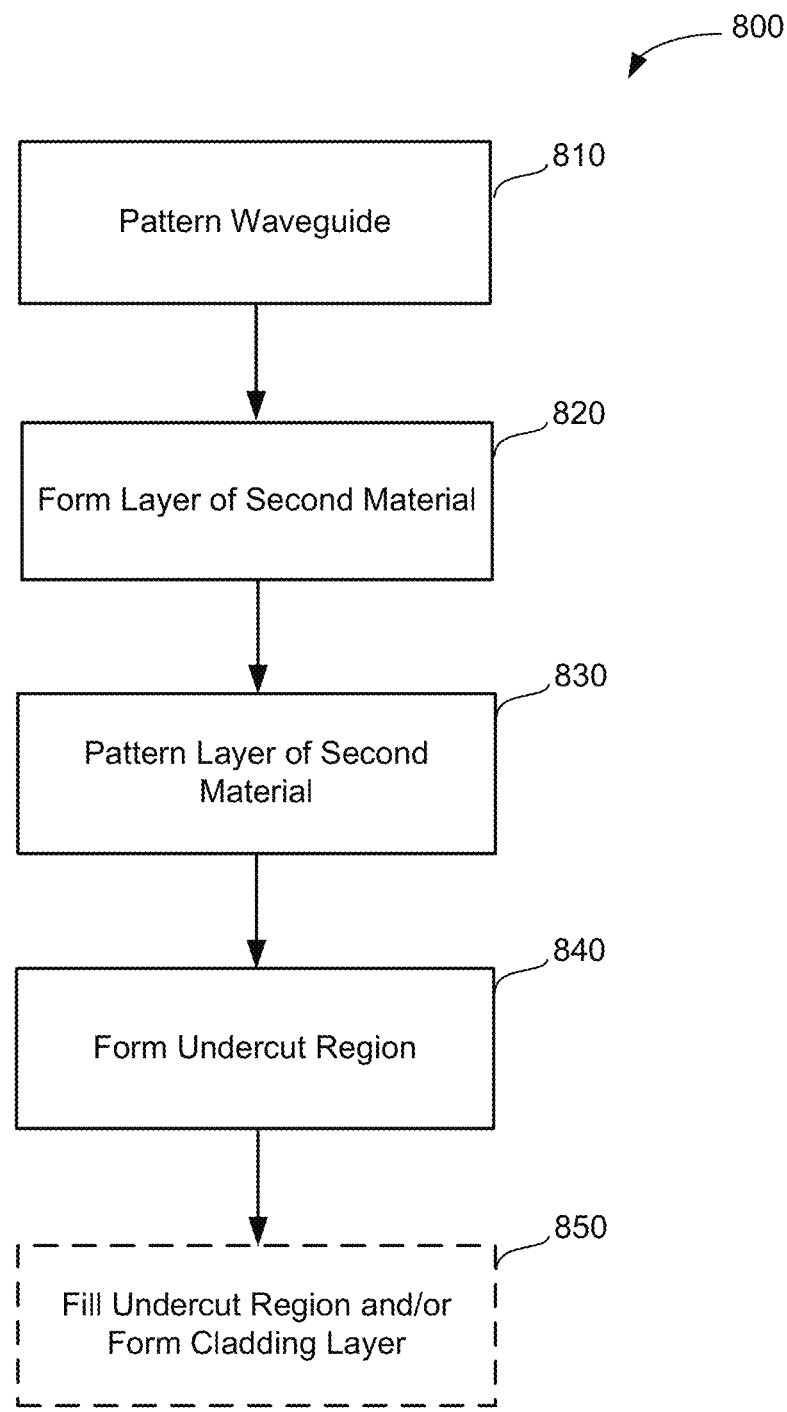
FIG. 8 is a schematic illustrating an exemplary method for forming a facet coupler according to a non-limiting embodiment.

Some embodiments of the present application relate to a method of manufacturing a facet optical coupler having a structure described herein. Any fabrication techniques suitable for silicon-based photonic integrated circuits may be used according to some embodiments. FIG. 8 shows steps of an example of a method of manufacturing a facet optical coupler, although other suitable methods and/or additional steps may be used to form any of the facet optical couplers described above. Method 800 may start with a silicon substrate having a layer of second material formed on the silicon substrate and a layer of silicon formed on the layer of second material. In some embodiments, a wafer may include a silicon substrate, a layer of second material on the silicon substrate, and a layer of silicon on the layer of second material, such as a silicon-on-insulator (SOI) wafer. In other embodiments, method 800 may include forming a layer of second material on a silicon substrate and forming a layer of silicon on the layer of second material.

Regardless of the techniques used to achieve this initial structure, method 800 may proceed by patterning a waveguide by act 810. Patterning the waveguide may include removing a portion of the silicon layer to achieve a desired structure for the waveguide. Method 800 may include forming additional second material on the patterned waveguide to form a layer of second material by act 820. In this manner, the waveguide may be embedded in the layer of second material. This act may include forming a layer of second material on a surface of the silicon substrate such that an edge of the layer of second material is substantially coplanar with the edge of the silicon substrate. Method 800 may also include patterning the layer of second material by act 830 with a suitable structure and dimensions, such as the configurations shown in FIGS. 3A-3C. Some embodiments may include forming the layer of second material with a decreasing size taken in a direction moving from the edge of the silicon substrate to the waveguide.

Method 800 may include forming an undercut region in the silicon substrate at act 840. The undercut region may have an index of refraction that differs from the silicon substrate. The silicon substrate may have a first index of refraction and the undercut region may have a second index of refraction less than the first index of refraction. The undercut region having a second index of refraction may be formed by removing a portion of the silicon substrate. For example, the portion of the silicon substrate may be removed by etching the silicon substrate at the sides of the layer of second material, such as by isotropic etching. Such techniques may allow removal of silicon both laterally and vertically to form an undercut region positioned between the silicon substrate and the layer of second material. In some embodiments, a protection layer (e.g., a photoresist mask) may be formed on the layer of second material to protect the layer of second material while forming the undercut region. In some embodiments, patterning of the layer of second material and forming the undercut region may be performed in a common set of steps by forming the protection layer in a desired pattern for the layer of second material and removing both the layer of second material and the portion of the silicon substrate removed to form the undercut region.

Forming the undercut region having the second index of refraction may include positioning the undercut region at an offset from an edge of the silicon substrate. In some embodiments, forming the undercut region having the second index of refraction may include forming the undercut region to extend beyond the layer of second material in a direction perpendicular to a direction of light propagation and parallel to an interface of the undercut region having the second index of refraction and the layer of second material (e.g., a direction along the y-axis in FIGS. 4A-4C). In some embodiments, a dimension (e.g., $D_{width}$ shown in FIG. 4A) of the undercut region having the second index of refraction is at least 10 microns. The dimension, $D_{width}$, may be considered as a dimension of the undercut region along a direction that is perpendicular to a direction of light propagation and parallel to an interface of the undercut region having the second index of refraction (e.g., a direction along the y-axis in FIGS. 4A-4C).

In some embodiments, the waveguide may have a variable dimension moving in a direction of the propagation of light. The waveguide may include a first portion overlapping the undercut region having the second index of refraction and a second portion not overlapping the undercut region where the waveguide increases in size moving in a direction from the first portion to the second portion.

In some embodiments, method 800 optionally includes filling the undercut region with a filler material having the second index of refraction by act 850. Filling the undercut region may include filling the undercut region with a liquid (e.g., an epoxy) and/or curing the liquid to form a solid. In some embodiments, act 850 may alternatively or additional involve forming a cladding layer disposed on the layer of second material, wherein the cladding layer has a lower index of refraction than the layer of second material. In some embodiments, filling the undercut region with a filler material and forming the cladding layer may be performed in a common set of steps. In such embodiments, the undercut region and the cladding layer may include a common material.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A facet optical coupler comprising:
   a substrate having opposing first and second two-dimensional edges;
   an undercut region in the substrate, the undercut region being proximate to and offset from the first two-dimensional edge of the substrate and being distal from the second two-dimensional edge of the substrate;
   a waveguide having an end over the undercut region; and
   a substantially solid layer of second material configured to optically couple an edge of the substantially solid layer of second material with the waveguide, wherein the edge of the substantially solid layer of second material is aligned with the first two-dimensional edge, the substantially solid layer of second material extending continuously over the undercut region between the end of the waveguide and the first two-dimensional edge, wherein the undercut region is closer to the first two-dimensional edge than is the end of the waveguide.

2. The facet optical coupler of claim 1, wherein the substrate further includes a surface, and the substantially solid layer of second material is disposed on the surface of the substrate, wherein the waveguide is embedded in the substantially solid layer of second material.

3. The facet optical coupler of claim 2, wherein the substantially solid layer of second material has a surface substantially co-planar with the first two-dimensional edge.

4. The facet optical coupler of claim 2, wherein the undercut region extends beyond the substantially solid layer of second material in a direction perpendicular to a direction of the waveguide.

5. The facet optical coupler of claim 2, wherein a dimension of the undercut region that is parallel to an interface of the undercut region and the substantially solid layer of second material is at least 10 microns.

6. The facet optical coupler of claim 2, wherein a dimension of the undercut region that is perpendicular to an interface of the undercut region and the substantially solid layer of second material is at least 2 microns.

7. The facet optical coupler of claim 2, wherein the substantially solid layer of second material decreases in size in a direction moving from the first two-dimensional edge of the substrate to the waveguide.

8. The facet optical coupler of claim 2, wherein the second material is a dielectric material.

9. The facet optical coupler of claim 2, wherein the second material includes one or more of $SiO_2$, $SiON$, and $Si_3N_4$.

10. The facet optical coupler of claim 2, further comprising a cladding layer on the substantially solid layer of second material.

11. The facet optical coupler of claim 10, wherein each of the cladding layer and the undercut region has a lower refractive index than the second material.

12. The facet optical coupler of claim 1, wherein the undercut region is offset from the first two-dimensional edge of the substrate by at least 20 microns.

13. The facet optical coupler of claim 1, wherein the waveguide has a first portion overlapping the undercut region and a second portion not overlapping the undercut region, and wherein the waveguide increases in size moving in a direction from the first portion to the second portion.

14. A method of manufacturing a facet optical coupler, the method comprising:
    forming a region in a substrate such that the region has a lower index of refraction than the substrate and is positioned proximate to but offset from a first planar edge of the substrate and distal a second planar edge of the substrate opposite the first planar edge;

forming a waveguide terminating over the region such that a distance between the waveguide and the first planar edge is greater than a distance between the region and the first planar edge; and forming a substantially solid layer of second material configured to optically couple an edge of the substantially solid layer of second material with the waveguide, wherein the edge of the substantially solid layer of second material is aligned with the first planar edge, the substantially solid layer of second material extending continuously over the region between an end of the waveguide and the first planar edge.

15. The method of claim 14, wherein forming the region comprises positioning the region at an offset of at least 20 microns from the first planar edge of the substrate.

16. The method of claim 14, wherein forming the region comprises removing and filling a portion of the substrate with a filler material having the lower index of refraction.

17. The method of claim 14, further comprising forming a cladding layer on the substantially solid layer of second material, wherein the waveguide is embedded in the substantially solid layer of second material and the cladding layer has a lower index of refraction than the substantially solid layer of second material.

18. The method of claim 17, wherein forming the region comprises forming the region to extend beyond the substantially solid layer of second material in a direction perpendicular to a direction of the waveguide.

19. The method of claim 17, wherein forming the substantially solid layer of second material comprises forming the substantially solid layer of second material with a decreasing size in a direction moving from the first planar edge of the substrate to the waveguide.

20. The method of claim 14, wherein forming the waveguide comprises forming the waveguide with a first portion overlapping the region and a second portion not overlapping the region, and wherein the waveguide increases in size moving in a direction from the first portion to the second portion.

* * * * *